United States Patent
Kar et al.

(10) Patent No.: US 9,508,262 B2
(45) Date of Patent: Nov. 29, 2016

(54) SYSTEMS AND METHODS FOR VOICE ENABLED TRAFFIC PRIORITIZATION

(71) Applicant: HONEYWELL INTERNATIONAL INC., Morristown, NJ (US)

(72) Inventors: Satyanarayan Kar, Karnaraka (IN); Sanjib Kumar Maji, Karnataka (IN); Sandeep Chakraborty, West Bengal (IN); Jitender Kumar Agarwal, UttarPradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/669,672

(22) Filed: Mar. 26, 2015

(65) Prior Publication Data
US 2016/0284220 A1 Sep. 29, 2016

(51) Int. Cl.
*G08G 5/00* (2006.01)
*G10L 15/26* (2006.01)
*G10L 15/22* (2006.01)

(52) U.S. Cl.
CPC .......... *G08G 5/0021* (2013.01); *G08G 5/0008* (2013.01); *G10L 15/22* (2013.01); *G10L 15/26* (2013.01); *G10L 2015/223* (2013.01)

(58) Field of Classification Search
CPC .................................................. G08G 5/0021
USPC ......................................... 340/961; 701/301
See application file for complete search history.

(56) References Cited

U.S. PATENT DOCUMENTS

| 6,700,482 B2 * | 3/2004 | Ververs et al. ............... 340/961 |
| 7,415,326 B2 | 8/2008 | Komer et al. |
| 2007/0288129 A1 | 12/2007 | Komer et al. |
| 2011/0282522 A1 | 11/2011 | Prus et al. |
| 2014/0122070 A1 * | 5/2014 | Prus ................ G08G 5/0021 704/235 |
| 2014/0232559 A1 | 8/2014 | Maji et al. |
| 2014/0303815 A1 | 10/2014 | Lafon et al. |
| 2015/0162001 A1 * | 6/2015 | Kar ................... G08G 5/0013 704/235 |
| 2015/0364044 A1 * | 12/2015 | Kashi ................ G08G 5/0095 701/120 |
| 2016/0093302 A1 * | 3/2016 | Bilek ..................... G10L 15/26 704/235 |

FOREIGN PATENT DOCUMENTS

| EP | 2770490 A1 | 8/2014 |
| WO | 2014115139 A1 | 7/2014 |

OTHER PUBLICATIONS

Fernandez, F. et al.; Human spontaneity and linguistic coverage: two related factors relevant to the performance of automatic understanding of ATC speech, 2006, IEEE.
Mihai; Reducing Pilot / ATC Communication Errors Using Voice Recognition, 27th International Congress of the Aeronautical Sciences, Jan. 1, 2010.
Manuel et al.; Automated Speech Recognition in ATC Environment, ATACCS 2012; Research Papers 46, May 31, 2012.
Extended EP Search Report for Application No. 16161775.8-1803 dated Jan. 7, 2016.

* cited by examiner

*Primary Examiner* — Brent Swarthout
(74) *Attorney, Agent, or Firm* — Lorenz & Kopf, LLP

(57) ABSTRACT

A system and method capable of responding to an audible traffic alert by visually depicting the identified neighboring aircraft traffic on the onboard display is presented. The system and method employ speech recognition in order to minimize the visual and manual cognitive workload associated with responding to a traffic alert. The system and method maximize the pilot's hands-on control of the host aircraft.

17 Claims, 5 Drawing Sheets

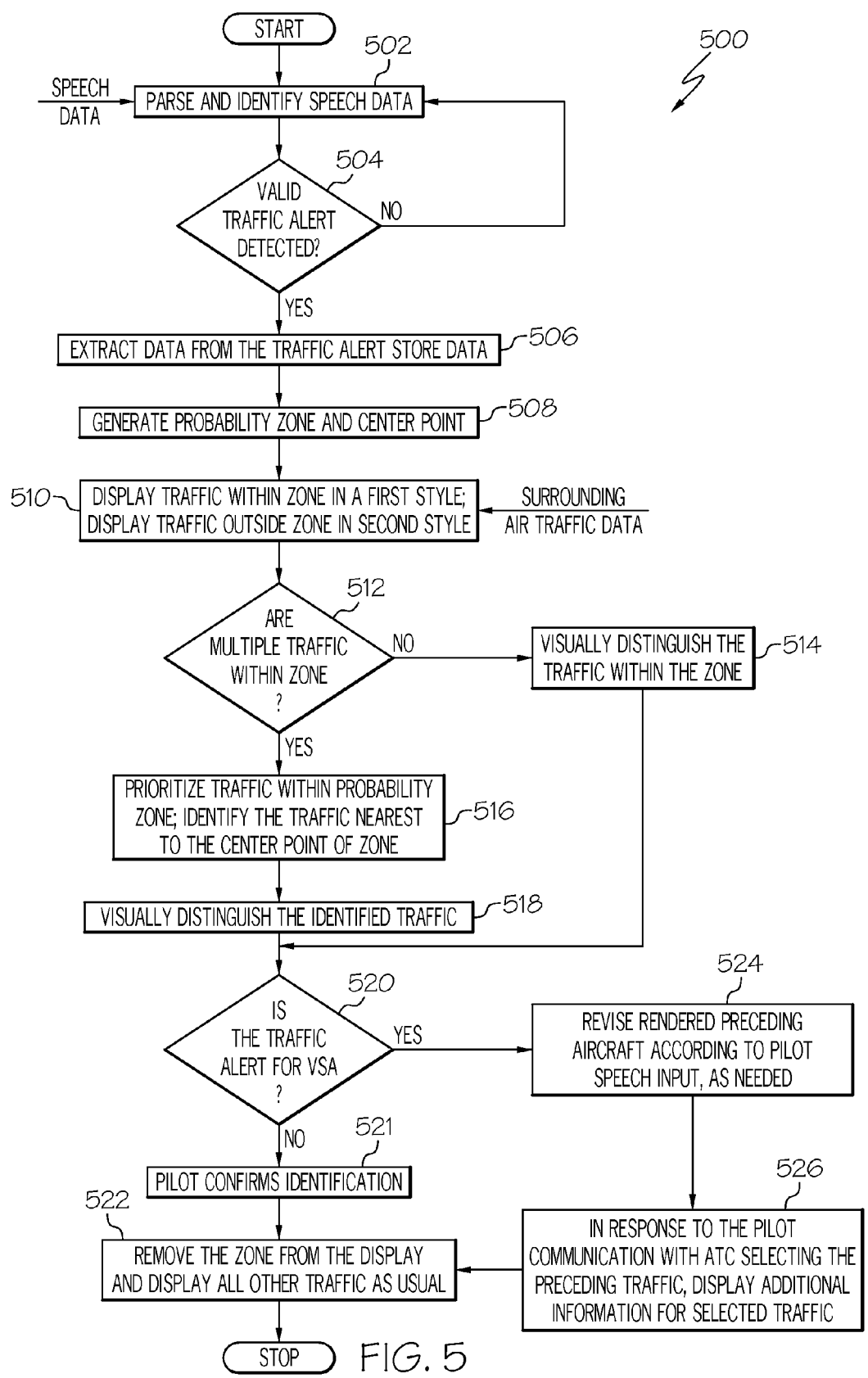

SYSTEMS AND METHODS FOR VOICE ENABLED TRAFFIC PRIORITIZATION

TECHNICAL FIELD

The present disclosure generally relates to traffic prioritization, and more particularly relates to systems and methods for voice enabled traffic prioritization.

BACKGROUND

Typically, traffic alerts are received from air traffic control (ATC) through voice communication annunciated within the cockpit of a host aircraft. The audible traffic alerts bring to the pilot's attention issues such as intruding aircraft traffic or aircraft traffic that should be monitored. As might be expected, traffic alerts provide a standardized format of identifying traffic information such as, but not limited to, a subject aircraft's bearing, altitude, distance, and type.

After hearing a traffic alert, the pilot will typically identify the subject aircraft. Identifying the subject aircraft can be a high cognitive workload task; the pilot must comprehend the audible information and integrate the audible information with a complexity of visual information. The pilot's visual channel for information flow may already be highly loaded during flight operations. A traffic alert further loads the visual channel of information flow, requiring the pilot to locate the subject aircraft among the neighboring aircraft on the aircraft's traffic display. In the case of VSA, the pilot needs to locate the subject traffic on the traffic display, and possibly out the window. After visually locating the subject aircraft, the pilot communicates to ATC the flight identification of subject aircraft, which is also called the preceding aircraft. After confirmation of the preceding aircraft from ATC, the pilot selects the preceding aircraft. Selecting the preceding aircraft is traditionally a manual task of entering information into a user input device. The aforementioned activities can further increase pilot cognitive load. Thus, there is a need for reducing the visual and manual cognitive workload associated with responding to traffic alerts.

Accordingly, a system and method capable of responding to an audible traffic alert by visually depicting the identified neighboring aircraft traffic on the onboard display is desirable. It is further desirable for the system and method to employ speech recognition in order to minimize the visual and manual cognitive workload associated with responding to a traffic alert. The desired system and method maximizes the pilot's hands-on control of the host aircraft.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A system is provided for traffic prioritization for a display module onboard a host aircraft, the display module configured to render neighboring aircraft traffic in response to traffic data from a source of traffic data, the host aircraft having a source of speech data. The system comprises: a command analyzer configured to receive speech data and identify, within the speech data, a valid traffic alert; and a processor coupled to the command analyzer and configured, in response to the command analyzer identifying a valid traffic alert, to: identify a center point; generate a probability zone that surrounds the center point; prioritize neighboring aircraft determined to be within the probability zone; and command the display module to render, in a visually distinguishable manner, each of the neighboring aircraft determined to be within the probability zone.

Also provided is a method for traffic prioritization for a display module onboard a host aircraft, the display module configured to render neighboring aircraft traffic based on received traffic data, the host aircraft having a source of speech data, the method comprises: in a command analyzer, receiving speech data comprising a valid air traffic control (ATC) command and identifying, in the speech data, a traffic alert; and in a processor, in response to the identified traffic alert, determining a center point; generating a probability zone surrounding the center point, prioritizing neighboring aircraft determined to be within the probability zone, and commanding the display module to render each of the following: each neighboring aircraft determined to be within the probability zone in first style, and each neighboring aircraft not determined to be within the probability zone, in a second style.

Another method is provided, the method being for traffic prioritization for a display module onboard a host aircraft, the display module configured to render neighboring aircraft traffic in response to traffic data from a source of traffic data, the host aircraft having a source of speech data, the method comprises: in a command analyzer, receiving speech data comprising a respective one or more of: traffic bearing, traffic altitude, traffic distance, and traffic type, converting the speech data into a text stream, parsing the text stream into a valid ATC command that is a traffic alert according to traffic command models, and storing, for the traffic alert, a respective one or more of traffic bearing, traffic altitude, traffic distance, and traffic type; and in a processor, in response to the traffic alert, identifying a center point, generating a probability zone associated with the center point, and commanding the display module to render: in a first style, neighboring aircraft determined to be within the probability zone, and in a second style, neighboring aircraft not determined to be within the probability zone.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

FIG. 5 is a flow chart describing steps of a voice enabled traffic prioritization process in accordance with an exemplary embodiment.

DETAILED DESCRIPTION

Figure 1:
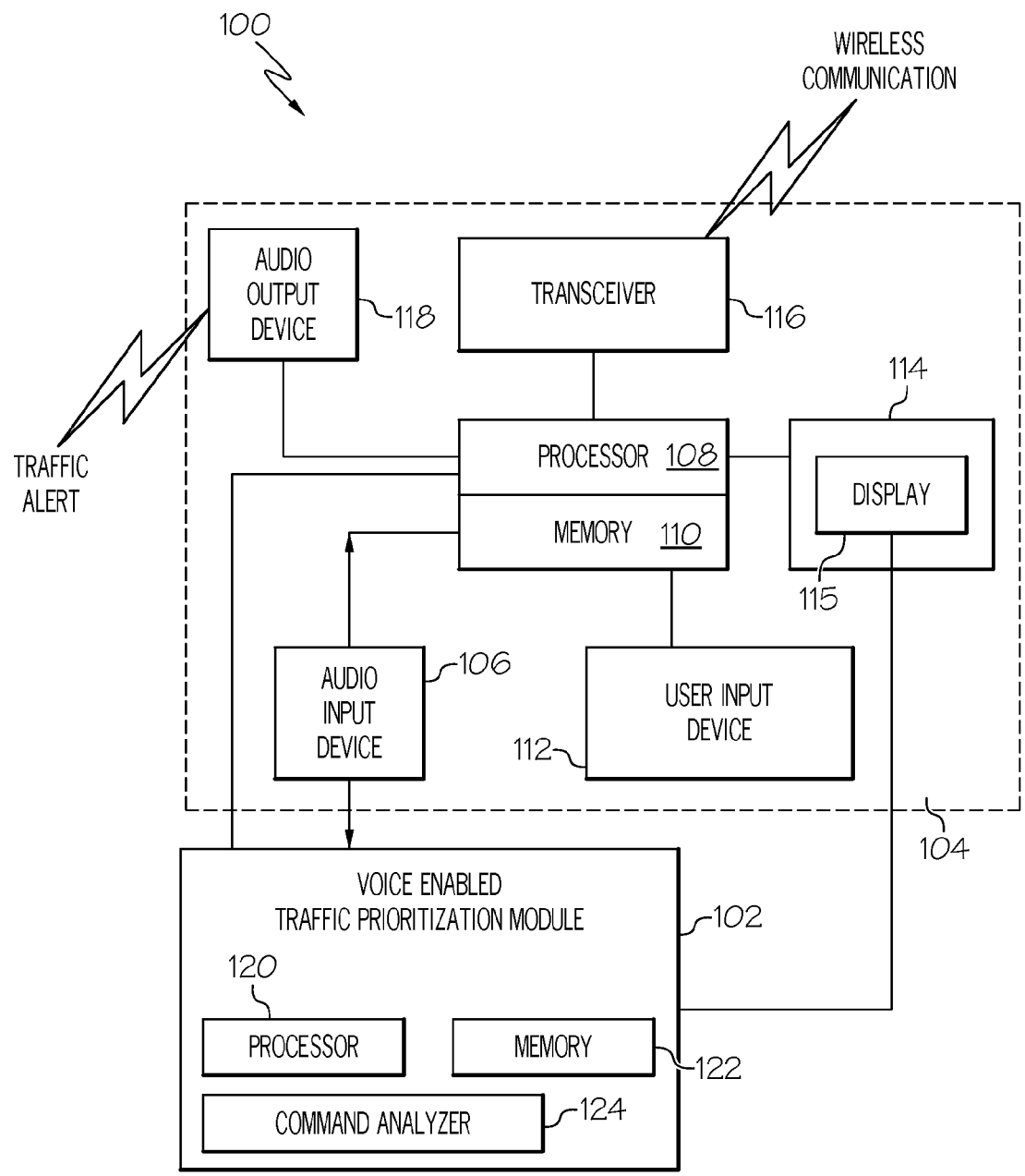
FIG. 1 is a block diagram of an aircraft display system with an exemplary embodiment of a voice enabled traffic prioritization module.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The various illustrative logical blocks, modules, and circuits described in connection with embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiment described herein is merely an example and serves as a guide for implementing the novel systems and methods herein on any user interface in any defense, industrial, commercial, or consumer avionics application. As such, the examples presented herein are intended as non-limiting.

FIG. 1 is a block diagram of an aircraft display system 100 with an exemplary embodiment of a voice enabled traffic prioritization module 102. As is readily appreciated, the voice enabled traffic prioritization module 102 is coupled to, and cooperates with, various traditional aircraft display system components 104, such as audio input device 106, processor 108, memory 110, user input device 112, display module 114 with display device 115, transceiver 116, and audio output device 118.

The transceiver 116 transmits/receives surrounding air traffic data for a plurality of neighboring air traffic, as wireless communication. For example, surrounding air traffic data can be provided by the Air Traffic Controller, Traffic Collision Avoidance System (TCAS), Automatic Dependent Surveillance-Broadcast (ADS-B), Traffic Information Services-Broadcast (TIS-B) and/or Automatic Dependent Surveillance-Re-broadcast (ADS-R). As used herein, "traffic data" may include any combination of surrounding air traffic and flight status data relevant to the operation of a host aircraft. In one embodiment, traffic data includes, for each of one or more neighboring aircraft traffic, an associated: traffic air speed, traffic bearing, traffic orientation, traffic location, and traffic altitude (each measured relative to the host aircraft), as well as a traffic identification. The transceiver 116 provides traffic data to the processor 108 and to the voice enabled traffic prioritization module 102.

Processor 108, in cooperation with memory 110, processes wireless communication, sends traffic data to the voice enabled traffic prioritization module 102, and generates commands for a variety of aircraft system components such as the audio input device 106 and audio output devices 118. The audio input device 106 receives audio input such as direct speech commands, spoken from pilots and crew, and output from radios and other suitable audio output devices 118 in the operational vicinity of the audio input device 106. Audio input device 106 converts received audio input into a signal referred to as speech data and supplies it to the processor 108. In the exemplary embodiment, the audio input device 106 also provides speech data to the voice enabled traffic prioritization module 102. Also, in response to commands from processor 108, the one or more audio output devices 118 generate audible information in the form of aural alerts, verbal information, sounds, warnings, and the like.

Another module receiving commands from the processor 108 is display module 114, which traditionally includes a cockpit display of traffic information (CDTI) display, and is employed to graphically render received traffic information pertaining to surrounding traffic. In response to commands from processor 108, display module 114 selectively renders various types of textual, graphic, and/or iconic information and graphical user interfaces (GUIs) on display device 115. Processor 108 and/or processor 120 processes the surrounding air traffic data and provides it to the voice enabled traffic prioritization module 102.

It will be appreciated that the display module 114 typically includes a CDTI display, used to display neighboring aircraft. Display module 114 may be implemented using any one of numerous known display devices 115 suitable for rendering textual, graphic, and/or iconic information in a format viewable by the user. Non-limiting examples of such display devices include various multifunction displays (MFD), Near to Eye (NTE), projection displays, cathode ray tube (CRT) displays, and flat screen displays such as LCD (liquid crystal display) and TFT (thin film transistor) displays. The display device 115 may additionally be implemented as a screen mounted display, or any one of numerous known technologies. It is additionally noted that the display device 115 may be configured as any one of numerous types of aircraft flight deck displays. For example, display device 115 may be configured as a multi-function display, a horizontal situation indicator, a vertical situation indicator, or the like. In the depicted embodiment, however, at least one display device 115 is configured as a primary flight display (PFD).

Traditional aircraft display system components 104 also include user input device 112, typically coupled to display module 114 and utilized by pilots to update and respond to viewed events on display device 115. User input device 112 may include any combination of one or more of the following: a keypad, touchpad, keyboard, mouse, touchscreen, joystick, knob, microphone, speech or gesture recognition device, or any other suitable device adapted to receive input from a user.

The exemplary embodiment of the voice enabled traffic prioritization module 102 includes a processor 120, memory device 122, and command analyzer 124. In practice, processor 120 may be merged with processor 108, and memory device 122 may be merged with memory 110. In one embodiment, the entire voice enabled traffic prioritization module 102 can be disposed aboard an aircraft 202 (see FIG. 2) for assisting in operations of the aircraft. However, in other embodiments, all or part of the voice enabled traffic prioritization module 102 may be disposed apart from the aircraft 202.

In the illustrated embodiment, the memory device 122 is in communication with the processor 120 and stores programs (such as the rules and traffic command models for a speech recognition system and/or voice command analyzer) executed by the processor 120. The memory device 122 and memory 110 may be random access memory (RAM), read-only memory (ROM), flash memory, a memory disk (e.g., a hard disk, removable, or optical disk), or any other suitable device for storing data, as realized by those skilled in the art. The memory devices 122 and 110 may be an integral part of the processor 120, and may include multiple memory devices.

In operation, the voice enabled traffic prioritization module 102, in response to a valid traffic alert providing traffic data associated with a specific aircraft, generates a probability zone with a center point. The probability zone is a volume in which the pilot may find the specific aircraft. The traffic alert provides aircraft (air traffic) traffic location data such as, traffic orientation, traffic range, traffic altitude, and traffic bearing for the specific aircraft. In response, the voice enabled traffic prioritization module 102 determines a center point to be at the traffic location of the specific aircraft. The center point may be optionally displayed, on the display device 115, at the traffic location from the (ATC provided) traffic alert. Neighboring aircraft are typically already on display on the display device 115. After generating the probability zone, the voice enabled traffic prioritization module 102 prioritizes, by distance from the center point 212 (see FIG. 2), each neighboring aircraft within the probability zone. Generation of the probability zone around the center point and prioritizing neighboring aircraft is described in more detail below, in connection with FIG. 2.

Advantageously, the voice enabled traffic prioritization module 102 highlights a highest priority aircraft, and declutters and simplifies the visual presentation of neighboring aircraft on display device 115. In addition, when the traffic alert is for a visual separation approach (VSA) maneuver, voice enabled traffic prioritization module 102 compares components of the pilot's speech data identifying a preceding aircraft to stored previously identified highest priority traffic information based on previous ATC communication, and revises the visual presentation of neighboring aircraft on display device 115 accordingly. This enables the pilot to easily recognize a preceding aircraft by viewing the display device 115 during a VSA maneuver.

Figure 2:
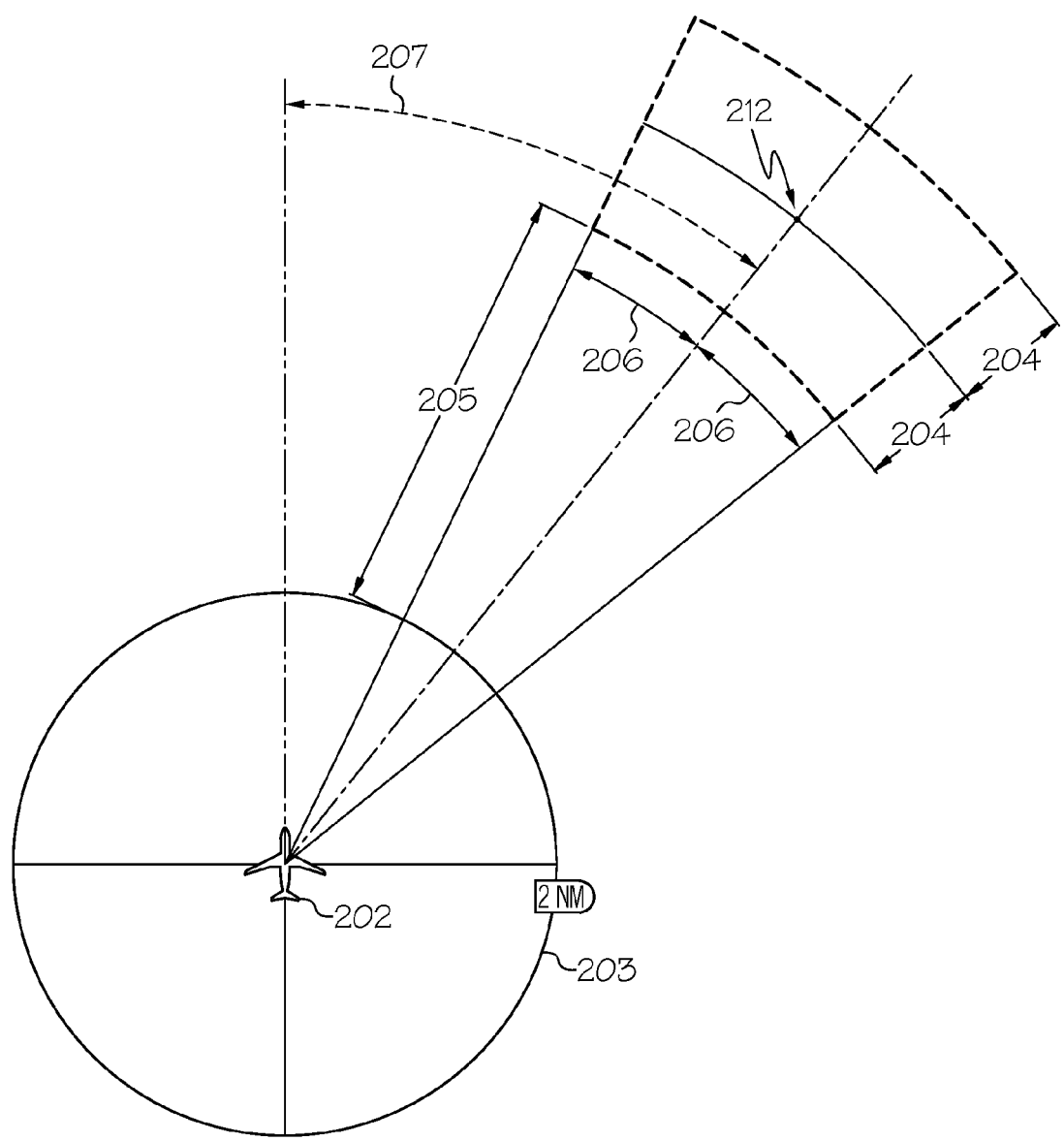
FIG. 2 is a simplified illustration of a probability zone generated according to the exemplary embodiment.

FIG. 2 is a simplified illustration of a probability zone 200 generated according to the exemplary embodiment. The host aircraft 202 is situated at the origin of range ring 203, which, in the exemplary embodiment, is a two nautical mile range ring. An example ATC traffic alert recites a traffic location as follows, "TRAFFIC ONE O'CLOCK FIVE MILES FLIGHT LEVEL TWO SEVEN ZERO." In response to this traffic alert, a center point 212 is determined, and is located:

Five nautical miles from host aircraft 202 (five nautical miles is represented as the two nautical mile ring 203 plus three additional nautical miles 205);

At "one o'clock," which translates into a thirty degree bearing from the host aircraft 202 (object 207 represents thirty degrees in FIG. 2); and At an altitude of 27,000 feet.

The probability zone 200 is a volume generated as plus or minus a predetermined bearing (object 206) from a line between the host aircraft 202 to the center point 212, and extending plus or minus a predetermined range (object 204 in FIG. 2) from the center point 212. For simplifying purposes, FIG. 2 depicts the probability zone in two dimensions; however, in operation, probability zone 200 extends from the traffic altitude (27,000 feet in this example) by plus or minus a predetermined altitude (not shown) in the z dimension from the center point 212. The predetermined bearing, range and altitude are threshold values that are configurable. In the exemplary embodiment, the predetermined range defaults to substantially plus or minus two nautical miles (NM), the predetermined altitude defaults to substantially plus or minus 500 feet vertically, and the predetermined bearing defaults to substantially plus or minus 15 degrees (object 206).

The voice enabled traffic prioritization module 102 generates the probability zone 200 and optionally renders it on display device 115. Neighboring aircraft determined by the voice enabled traffic prioritization module 102 to be within the probability zone are rendered in a first display style, and neighboring aircraft determined not to be within the probability zone are rendered in a second display style. Examples of symbology used as the first display style and the second display style will be described further below.

When more than one neighboring aircraft is determined to be within the probability zone 200, voice enabled traffic prioritization module 102 prioritizes each neighboring aircraft within the probability zone such that the highest priority neighboring aircraft is closest to the center point. In the exemplary embodiment, voice enabled traffic prioritization module 102 renders the neighboring aircraft with the highest priority in a visually distinguishable manner. Even if there is only one neighboring aircraft in the probability zone, voice enabled traffic prioritization module 102 will render it in a visually distinguishable manner.

In some embodiments, visual distinguishability is achieved by highlighting. Methods and techniques for visually distinguishing an aircraft on the display device 115 also include shade changes, opacity changes, using dotting boundaries on symbols, changing a symbol to a different symbol, overlaying a shape or symbol, and the like. It is readily appreciated that a technique or symbol used to render an aircraft in a visually distinguishable manner is intended to render that aircraft to be recognizably distinct from the rendering that it would have in the first display style or the second display style described in connection with FIG. 3.

Figure 3:
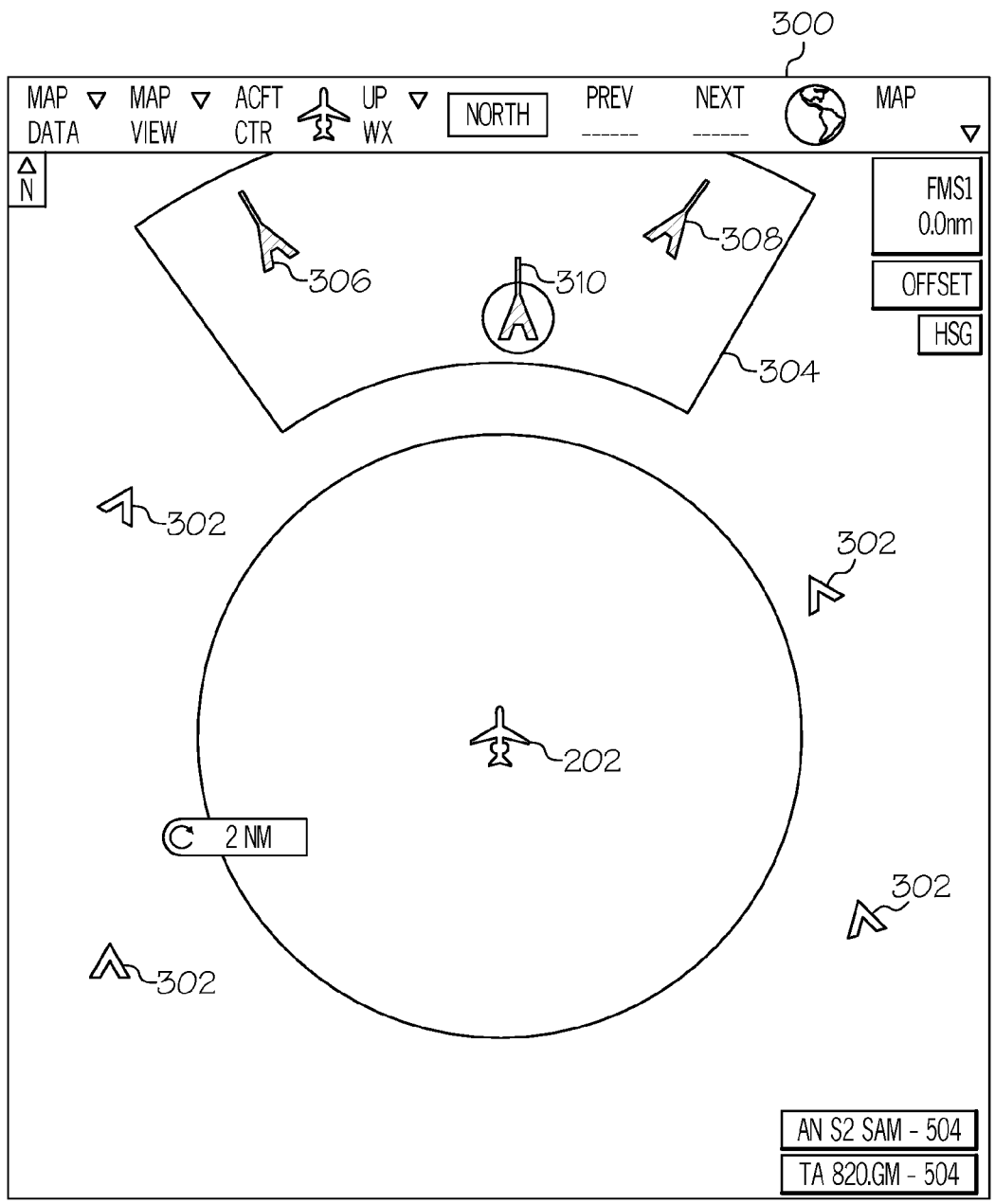
FIG. 3 illustrates an aircraft display graphic in accordance with the exemplary embodiment.

FIG. 3 illustrates an aircraft display graphic 300 in accordance with the exemplary embodiment. Probability zone 304 is shown, as are three identified neighboring aircraft (306, 308, and 310) which are determined to be within the probability zone, and are thus rendered in a first display style. Host aircraft 202, and four neighboring aircraft 302 that are determined not be in the probability zone are shown rendered in a second display style, which may be a chevron or triangular shape in the exemplary embodiment. Note that FIG. 3 depicts probability zone with a lined outline. The probability zone may be rendered in any method or style that effectively displays its shape and location without obscuring other necessary traffic information from the pilot.

Figure 4:
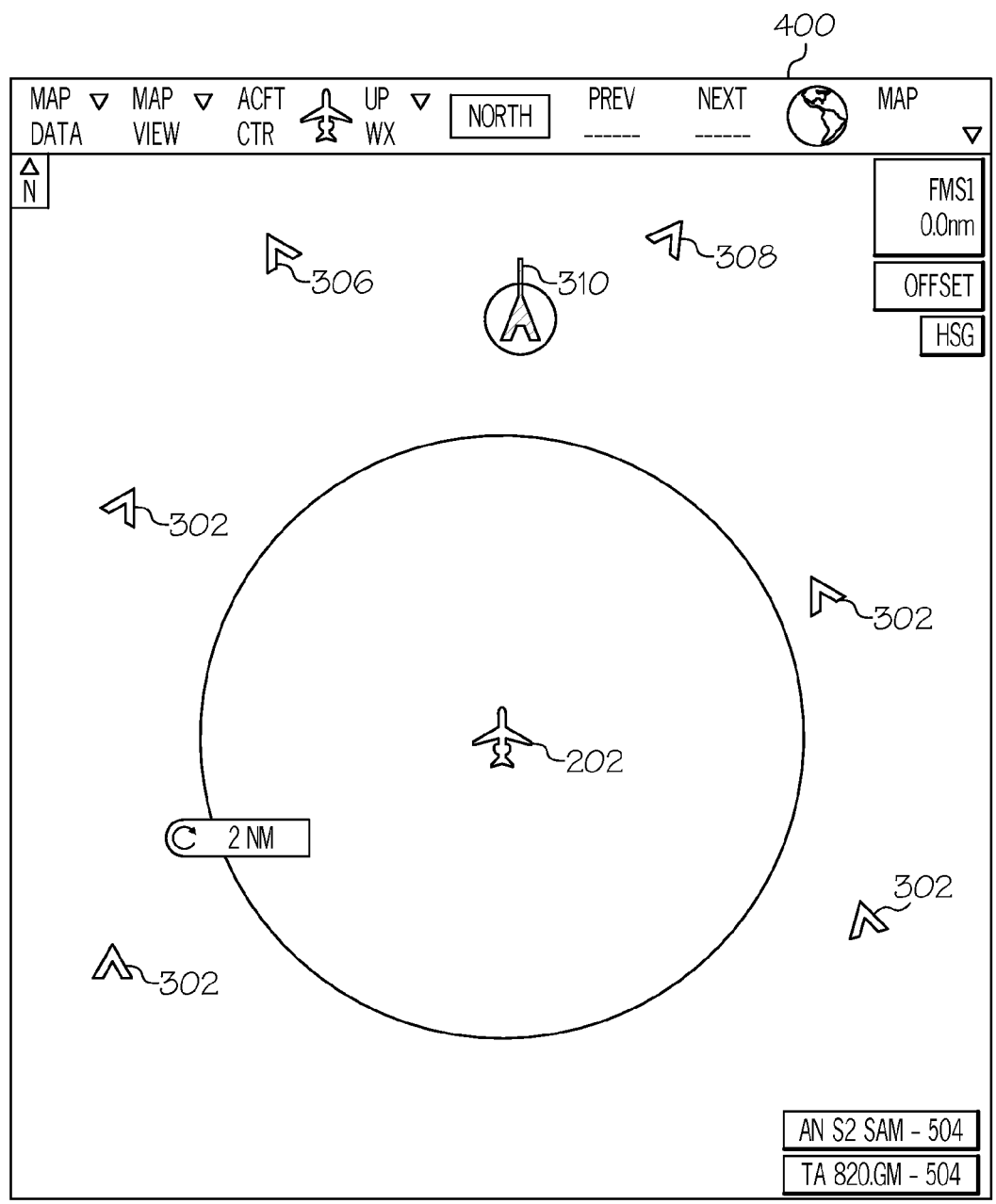
FIG. 4 illustrates another aircraft display graphic in accordance with the exemplary embodiment.

FIG. 4 illustrates another aircraft display graphic 400 in accordance with the exemplary embodiment. Note that, in FIG. 4, the probability zone is removed from the display graphic 400, in response to pilot input. Host aircraft 202 and the four neighboring aircraft 302 are again shown as before the creation of probability zone, and the second style is removed. The two identified neighboring aircraft (306, and 308), determined to be within the probability zone and rendered similar to neighboring aircraft 302, are shown. In FIG. 4, the highest priority neighboring aircraft 310 is shown rendered in a visually distinguishable manner. The exemplary embodiment employs a circle around a portion of the first display style to visually distinguish the highest priority neighboring aircraft 310, but as mentioned hereinabove, other visually distinguishing techniques may be employed.

FIG. 5 is a flow chart describing steps of a voice enabled traffic prioritization process 500 in accordance with an exemplary embodiment. As may be readily appreciated, the sequence of steps in process 500 may be rearranged, steps may be deleted, and steps may be added. As described above, audio input into audio input device 106 may be direct pilot commands, or output from any suitable onboard speaker or radios. Audio input device 106 converts the audio input into a signal referred to as speech data.

Process 500 begins upon receiving speech data at STEP 502. Command analyzer 124 is configured to continuously receive speech data from audio input device 106. At STEP 502, command analyzer 124 parses the received speech data into text and identifies the speech data according to stored rules and traffic command models. Command analyzer 124 arranges the parsed text, syntactically, to identify ATC commands, and then further identifies ATC commands that are traffic alerts. In order to perform these functions, command analyzer 124 employs stored speech and command models supplied by any suitable commercially available speech recognition system and/or voice command analyzer. As is readily appreciated, a user may customize the speech and command models prior to, or during, operation.

When command analyzer 124 identifies a valid traffic alert in the speech data (STEP 504), command analyzer 124 extracts and stores the associated traffic data from the traffic alert at STEP 506. As mentioned above, valid traffic alerts comprise components of speech data in a standard format, the components being traffic location information such as traffic bearing, altitude, distance, type, and the like. Referring back to the example ATC traffic alert from FIG. 2, a typical traffic alert provides traffic location information in the following standard format, "TRAFFIC ONE O'CLOCK FIVE MILES FLIGHT LEVEL TWO SEVEN ZERO." In response to this audio traffic alert, in traditional systems, a pilot had to cognitively discern the audio information, and visually locate on the display, and through the windows, the associated neighboring aircraft.

Process 500 advantageously prioritizes and visually distinguishes, on the display, the associated neighboring aircraft for the pilot (see, FIG. 3 and FIG. 4). As an additional advantage, at STEP 506, the exemplary embodiment stores components of speech data, such as relevant traffic information, in local memory for recall, prioritizing and highlighting (i.e., visually distinguishing), and comparison in later stages.

At STEP 508, process 500 generates a probability zone 200 surrounding the center point 212 based on a predetermined bearing, predetermined range, and predetermined altitude. As previously mentioned, predetermined values are threshold values that are configurable, and may be supplied by user input via user input device 112, speech input through the audio input device 106, or by being uploaded from a storage database or memory device, such as memory device 122.

At STEP 510, traffic data is received and neighboring traffic determined to be within the probability zone 200 are displayed in a first style and neighboring traffic not determined to be within the probability zone 200 (i.e., outside the probability zone) are displayed in a second style. For reference, FIG. 3 depicts neighboring aircraft 306, 308 and 310 displayed in a first style, and multiple neighboring aircraft 302 displayed in a second style. The symbology used for the first style and second style may take many forms, provided they are readily comprehensible to the pilot as different from one another, and also suitable for display on the display device 115 without adversely affecting the visual presentation of other relevant information.

If only one neighboring aircraft is within the probability zone 200, process 500 renders the one neighboring aircraft in a visually distinguishable manner at STEP 514. If more than one neighboring aircraft are determined to be within the probability zone 200 (STEP 512), the traffic nearest the center point 212 (i.e., the traffic with the highest priority), is identified, and remaining neighboring traffic within the probability zone is prioritized at STEP 516. The traffic with the highest priority is rendered in a visually distinguishable manner at STEP 518. For example, in FIG. 3, highest priority neighboring aircraft 310 is displayed in a visually distinguishable manner when compared to neighboring aircraft 306 and 308. It is to be noted that the exemplary embodiment may render neighboring aircraft in styles that indicate whether or not they are in the probability zone, and indicate priority (for reference, see FIG. 3 and FIG. 4).

Visual Separation Approach (VSA) is a procedure in which the flight crew of an aircraft is required to visually follow a preceding aircraft, and maintain a safe separation during approach, as directed by the Air Traffic Controller. In one example, during the "visual acquisition phase (VAP)," flight crew has to discern the preceding aircraft on the onboard display (for example a CDTI display) and out of the window of the aircraft, as commanded by the Air Traffic Controller. This step generally requires the pilot to "read back" the flight identification (ID) of the preceding aircraft to confirm to ATC that the preceding aircraft has been located. The process 500 stores the flight ID from the pilot voice command to confirm visual acquisition of preceding aircraft. Typically pilot communicates with ATC to confirm, with a voice command, the subsequent visual acquisition, for example, with a response such as, "TRAFFIC UAL1234 IN SIGHT," or "CDTI CONTACT UAL1234," where UAL1234 is flight ID of the preceding aircraft as visually acquired by pilot. At STEP 520, if the traffic alert is identified by command analyzer 124 as a VSA command, process 500 analyzes speech input according to VSA command requirements.

Typically, the VSA command exchange is completed when ATC confirms a pilot supplied flight ID by issuing a "MAINTAIN OWN SEPARATION" command. Process 500 receives elements of the speech input of the flight crew confirming visual acquisition as described above and compares stored traffic data (STEP 524), such as the flight ID, with the highlighted traffic. If the previously identified, visually distinguished (highlighted) neighboring traffic from STEP 518 or STEP 514 is not the same as the stored flight ID of the preceding traffic identified by the pilot, process 500 switches the "rendering in a visually distinguishing technique" from the previously identified neighboring aircraft to the pilot identified preceding aircraft on the display 115 (STEP 524).

Once the pilot communication with ATC (read-back of the ATC command) "MAINTAIN OWN SEPARATION," is completed, process 500 selects the identified preceding aircraft (STEP 526), and renders additional information for the selected preceding neighboring aircraft. The rendering of the probability zone on the display device 115 is removed or terminated at STEP 522.

In STEP 520, if the Traffic alert is not identified as VSA traffic alert, the pilot confirms the identified traffic from STEP 518 in STEP 521. Process 500 may remove the zone (STEP 522) from the display 115 in response to confirmation of the identification of the traffic from the pilot (STEP 521). Once the zone is removed, all other traffic (except the highlighted traffic) may be rendered as usual, in the graphic style it was rendered before starting of process 500.

As described in connection with FIG. 1, the steps of process 500, described in the embodiments disclosed herein, may be embodied in hardware, in a software module executed by a processor (such as processor 120 or processor 108), or in any combination of the two.

Thus there has been provided a system and method capable of responding to an audible traffic alert by visually depicting the identified neighboring aircraft traffic on the onboard display is presented. The system and method employ speech recognition in order to minimize the visual and manual cognitive workload associated with responding to a traffic alert. The system and method maximize the pilot's hands-on control of the host aircraft.

While at least one exemplary embodiment has been presented in the foregoing detailed description, it should be appreciated that a vast number of variations exist. It being understood that various changes may be made in the function and arrangement of elements described in an exemplary embodiment without departing from the scope of the present disclosure as set forth in the appended claims.

What is claimed is:

1. A system for traffic prioritization for a display module onboard a host aircraft, the display module configured to render neighboring aircraft traffic in response to traffic data from a source of traffic data, the host aircraft having a source of speech data, the system comprising:
   a command analyzer configured to receive speech data and identify, within the speech data, a valid traffic alert and
   a processor coupled to the command analyzer and configured, in response to the command analyzer identifying a valid traffic alert, to:
   identify a center point;
   generate a probability zone that surrounds the center point, the probability zone having a volume bounded laterally by plus or minus a predetermined bearing from a line between the host aircraft and the center point, longitudinally by the center point plus or minus a predetermined range, and vertically by the center point plus or minus a predetermined altitude;
   prioritize neighboring aircraft determined to be within the probability zone; and
   command the display module to render, in a visually distinguishable manner, each of the neighboring aircraft determined to be within the probability zone.

2. The system of claim 1, wherein the command analyzer is further configured to:
   receive traffic command models;
   convert the speech data into a text stream; and
   parse the text stream into valid ATC commands according to the traffic command models.

3. The system of claim 2, wherein the command analyzer is further configured to identify valid ATC commands that are valid traffic alerts.

4. The system of claim 2, wherein the command analyzer is further configured to store components of speech data associated with respective valid ATC traffic alerts.

5. The system of claim 1, wherein the predetermined bearing is substantially fifteen degrees, the predetermined range is substantially 2 nautical miles, and the predetermined altitude is substantially five hundred feet.

6. The system of claim 1, wherein the processor is further configured to command the display to render, in a visually distinguishable manner, the probability zone.

7. The system of claim 1, wherein the processor is further configured to command the display to render, in first style, each of the neighboring aircraft determined to be within the probability zone, and to render, in a second style, each of the neighboring aircraft not determined to be within the probability zone.

8. The system of claim 4, wherein speech data for a valid traffic alert data comprises, a respective one or more of: traffic bearing, traffic altitude, traffic distance, and traffic type.

9. The system of claim 1, wherein the processor is further configured to:
   command the display to render, in a visually distinguishable manner, a neighboring aircraft with the highest priority defined as the closest neighboring aircraft to the center point.

10. The system of claim 9, wherein the processor is further configured, in response to an ATC command that is determined to be a visual separation approach (VSA) command including an identified preceding aircraft, to:
    revise the rendering of the highest priority neighboring aircraft according to a flight ID in the pilot confirmation, and after confirmation from pilot to start a VSA procedure, select the aircraft having the flight ID in the pilot confirmation.

11. The system of claim 10, wherein the processor is configured to compare the flight ID of the pilot identified preceding aircraft to stored components of speech data associated with the highest priority neighboring aircraft.

12. A method for traffic prioritization for a display module onboard a host aircraft, the display module configured to render neighboring aircraft traffic based on received traffic data, the host aircraft having a source of speech data, the method comprising:
in a command analyzer,
receiving speech data comprising a valid air traffic control (ATC) command; and
identifying, in valid air traffic control (ATC) command, a traffic alert; and
in a processor, in response to the identified traffic alert,
determining a center point;
generating a probability zone surrounding the center point, the probability zone having a volume bounded laterally by plus or minus a predetermined bearing from a line between the host aircraft and the center point, longitudinally by the center point plus or minus a predetermined range, and vertically by the center point plus or minus a predetermined altitude;
prioritizing neighboring aircraft determined to be within the probability zone, and
commanding the display module to render each of the following:
each neighboring aircraft determined to be within the probability zone in first style, and
each neighboring aircraft not determined to be within the probability zone, in a second style.

13. The method of claim 12, wherein the step of identifying valid ATC commands comprises:
converting the speech data into a text stream;
parsing the text stream into the valid ATC commands according to traffic command models; and
storing, for valid ATC commands, a respective one or more of traffic bearing, traffic altitude, traffic distance, and traffic type.

14. The method of claim 13, further comprising commanding the display to render, in a visually distinguishable manner, the highest priority neighboring aircraft, defined as a neighboring aircraft closest to the center point.

15. The method of claim 14, further comprising, in response to an ATC command that is determined to be a visual separation approach (VSA) command including an identified preceding aircraft:
revise the rendering of the highest priority neighboring aircraft according to a flight ID in the pilot confirmation, and
after confirmation from pilot to start a VSA procedure, select the aircraft having the flight ID in the pilot confirmation.

16. The method of claim 15, further comprising comparing the flight ID of the pilot identified preceding aircraft to a stored flight ID associated with the highest priority neighboring aircraft.

17. A method for traffic prioritization for a display module onboard a host aircraft, the display module configured to render neighboring aircraft traffic in response to traffic data from a source of traffic data, the host aircraft having a source of speech data, the method comprising:
in a command analyzer,
receiving speech data comprising, a respective one or more of: traffic bearing, traffic altitude, traffic distance, and traffic type,
converting the speech data into a text stream,
parsing the text stream into a valid ATC traffic command that is a traffic alert according to traffic command models, and
storing, for the traffic alert, a respective one or more of traffic bearing, traffic altitude, traffic distance, and traffic type; and
in a processor, in response to the traffic alert,
identifying a center point,
generating a probability zone associated with the center point, the probability zone being a volume bounded laterally by plus or minus a predetermined bearing from a line between the host aircraft to the center point, longitudinally by the center point plus or minus a predetermined range, and vertically by the center point plus or minus a predetermined altitude;
prioritizing each of the neighboring aircraft by distance from the center point, such that the highest priority neighboring aircraft is the closest to the center point; and
commanding the display module to render:
in a first style, neighboring aircraft determined to be within the probability zone,
the highest priority neighboring aircraft in a visually distinguishable manner with respect to the remaining neighboring traffic, and
in a second style, neighboring aircraft not determined to be within the probability zone.

* * * * *